United States Patent
Li et al.

(10) Patent No.: US 11,917,598 B2
(45) Date of Patent: Feb. 27, 2024

(54) METHOD FOR MODE SELECTING AND SWITCHING IN DUAL-FREQUENCY INTEGRATED SYSTEM

(71) Applicant: XIDIAN UNIVERSITY, Shaanxi (CN)

(72) Inventors: Xiaohui Li, Shaanxi (CN); Siting Lv, Shaanxi (CN); Hongjie Wan, Shaanxi (CN); Ying Li, Shaanxi (CN)

(73) Assignee: XIDIAN UNIVERSITY, Shaanxi (CN)

( * ) Notice: Subject to any disclaimer, the term of this patent is extended or adjusted under 35 U.S.C. 154(b) by 131 days.

(21) Appl. No.: 17/363,599

(22) Filed: Jun. 30, 2021

(65) Prior Publication Data

US 2022/0070862 A1    Mar. 3, 2022

(30) Foreign Application Priority Data

Aug. 31, 2020  (CN) .......................... 202010892373.X (51) Int. Cl.
*H04W 72/0453* (2023.01)
*H04W 24/08* (2009.01)
(Continued)

(52) U.S. Cl.
CPC ....... *H04W 72/0453* (2013.01); *H04L 5/0057* (2013.01); *H04W 24/08* (2013.01);
(Continued)

(58) Field of Classification Search
None
See application file for complete search history.

(56) References Cited

U.S. PATENT DOCUMENTS 10,938,113 B1 *  3/2021  Kim ....................... H01Q 13/16
2013/0156120 A1 *  6/2013  Josiam ................. H04B 7/0617
                                                              375/260
(Continued)

FOREIGN PATENT DOCUMENTS

CN   200510099188.0    9/2005
CN   201610147760.4    3/2016
(Continued)

OTHER PUBLICATIONS

"The Friis Equation" (see web document attached, copyright 2009-2015), https://www.antenna-theory.com/basics/friis.php (Year: 2015).*
(Continued)

*Primary Examiner* — Jay L Vogel
(74) *Attorney, Agent, or Firm* — Workman Nydegger (57) ABSTRACT

A method, base station and user equipment are provided for wireless communication. The method can include steps: transmitting data on a first frequency band; transmitting, on a second frequency band, a detection signal for detecting a channel condition of the second frequency band; generating channel condition information about the second frequency band based on the received detection signal; feeding back the channel condition information via the first frequency band; and selecting a current data transmission frequency band based at least in part on the feedback channel condition information about the second frequency band and/or traffic requirement information; wherein the current data transmission frequency band is any one of the first frequency band, the second frequency band or a cooperative transmission of the first frequency band with the second frequency band.

17 Claims, 3 Drawing Sheets

(51) Int. Cl.
*H04W 72/542* (2023.01)
*H04W 36/00* (2009.01)
*H04L 5/00* (2006.01)
*H04W 36/06* (2009.01)
*H04W 24/10* (2009.01)

(52) U.S. Cl.
CPC ... *H04W 36/0072* (2013.01); *H04W 36/0088* (2013.01); *H04W 36/06* (2013.01); *H04W 72/542* (2023.01); *H04W 24/10* (2013.01)

(56) References Cited

U.S. PATENT DOCUMENTS

| | | | | |
|---|---|---|---|---|
| 2016/0302230 | A1* | 10/2016 | Novlan | H04B 17/318 |
| 2017/0332264 | A1* | 11/2017 | Mo | H04W 24/08 |
| 2021/0368471 | A1* | 11/2021 | Manolakos | H04L 5/0053 |

FOREIGN PATENT DOCUMENTS

| | | | | |
|---|---|---|---|---|
| WO | WO-2018063074 A1 * | 4/2018 | | H04L 5/0048 |
| WO | WO-2020088266 A1 * | 5/2020 | | H04L 5/0057 |

OTHER PUBLICATIONS

"RSRQ to SINR Relation" (published 2016, see printed copy of webpage), https://arimas.com/2016/04/24/164-rsrq-to-sinr/ (Year: 2016).*

U.S. Appl. No. 63/027,441 filed May 20, 2020 (Year: 2020).*

* cited by examiner

METHOD FOR MODE SELECTING AND SWITCHING IN DUAL-FREQUENCY INTEGRATED SYSTEM

CROSS-REFERENCE TO RELATED APPLICATIONS

The present invention claims the benefit of priority to CN Patent Application No. CN202010892373.X, filed on Aug. 31, 20201, the entire content of which is incorporated herein by reference.

FIELD OF THE INVENTION

The present invention relates to a method for wireless communication, particularly to a method for mode selecting and switching in dual-frequency integrated systems.

BACKGROUND

A dual-frequency integrated system may operate at C-band or millimeter wave band, to guarantee that communication transmission is not interrupted when channel conditions of the communication system change. C-band is a band of operating frequencies between 4.0G-8.0 GHz and is also the dominant band in the fourth generation of mobile communication. C-band communication has advantages of mature technology, complete infrastructures, strong signal penetrability and large coverage. However, since C-band resources are increasingly consumed and requirements for mobile communication are increasingly growing, the development and utilization of the millimeter wave band provides wide space for mobile communication.

The millimeter wave has advantages of wide spectrum, high stability and good directionality, therefore becomes one of frequency bands used in the fifth generation of mobile communication and also a research hotspot presently. The large bandwidth and high speed of the millimeter wave can meet users' requirements for particular scenes, such as indoor ultra-high speed data transmission, Internet of Things and the like. In 5G, the usable maximum bandwidth in the millimeter wave is 400 MHz, and a data rate may be up to 10 Gbps or even higher.

In view of the propagation characteristics and coverage capability of millimeter wave, the millimeter wave is suitable for deployment in indoor environments and outdoor environments that are relatively open with no or few blockages. Thus, in the whole propagation path, its directional characteristics will be more advantageous. However, millimeter wave has disadvantages of difficulty in penetrating buildings or obstacles, readily absorbability and large path loss. Therefore, when the millimeter wave transmission is suffering severe loss, the frequency band may be switched to utilize C-band for data transmission and reception as appropriate, thereby meeting system's transmission requirements.

Chinese Patent No. ZL201610147760.4 discloses a wireless millimeter wave point-to-point backbone transmission system with hybrid bands. The system comprises at least two logically complete communication subsystems and a common traffic data processing module. The communication subsystems may operate in different communication frequency bands, such as millimeter wave, C-band etc. The system performs a method for mode selection and switching in which a traffic data processing module transmits data to only one of the subsystems in a same period, and other subsystems are in off state. If the current subsystem's link is interrupted, the traffic data processing module will switch data transmission to other communication subsystem. The method allows for the function of subsystems operating in different frequency bands. However, band switching can be performed only if the communication link of the operating subsystem is interrupted, and it is not possible to adaptively switching bands depending on current channel conditions.

Chinese Patent No. ZL200510099188.0 discloses a multi-band wireless transceiver having a plurality of signal processing paths and a control method thereof. The transceiver includes a band identifying circuit for identifying frequency bands. Firstly, the band identifying circuit identifies bands from the band information received from the controller, and then selects a signal processing path according to the identified bands. This method can identify signals of different bands and perform respective processing functions, and it focuses on the overall constitution of the transceiver and the band identifying circuit. However, the disclosure fails to provide a complete and detail solution for selecting corresponding signal processing paths with the identified band information.

SUMMARY OF THE INVENTION

The object of the present invention is to provide a method for wireless communication, in order to overcome at least one of the above-stated deficiencies of prior arts.

In one aspect, a method for wireless communication is provided. The method comprises: transmitting data on a first frequency band; transmitting, on a second frequency band, a detection signal for detecting a channel condition of the second frequency band; generating channel condition information about the second frequency band based on the received detection signal; feeding back the channel condition information via the first frequency band; and selecting a current data transmission frequency band based at least in part on the feedback channel condition information about the second frequency band and/or traffic requirement information; wherein the current data transmission frequency band is any one of the first frequency band, the second frequency band or a cooperative transmission of the first frequency band with the second frequency band. The method can switch the current data transmission frequency band based on detected channel conditions, to ensure that data transmission is not interrupted.

In some embodiments, the first frequency band is C-band, and the second frequency band is millimeter wave band.

In some embodiments, the detection signal has a frame format in which each detection signal is provided at intervals of 200 ms and contains 1 detection frame and 19 normal frames; each detection frame is of 10 ms and contains 10 sub-frames; each sub-frame is of 1 ms and contains 4 slots; each slot contains 14 OFDM symbols; each detection signal occupies 8 OFDM symbols in each slot in time domain, and all of the detection signals are inserted within the whole band in frequency domain.

In some embodiments, the channel condition information about the second frequency band is obtained based on the received detection signals; and the channel condition information about the second frequency band comprises channel line of sight (LOS)/no-line of sight (NLOS) information about the second frequency band, receiving power of the detection signal, and signal to interference plus noise ratio (SINR) of the detection signal.

In some embodiments, the method is used for wireless communication of a dual-frequency integrated system; the dual-frequency integrated system comprises a base station and a user equipment; the base station is configured to transmit the detection signal to the user equipment on the second frequency band; the user equipment is configured to obtain channel condition information about the second frequency band based on the received detection signals and to feedback the channel condition information to the base station via the first frequency band.

In some embodiments, the detection signal is transmitted from the base station to the user equipment at intervals of 200 ms. But the present invention is not limited to the interval of 200 ms.

In some embodiments, the method further comprises: receiving, by the user equipment, the data on the second frequency band; calculating receiving power and SINR of a reference signal by using the data received on the second frequency band, and feeding back the receiving power and the SINR of the reference signal to the base station; comparing, by the base station, the receiving power and the SINR of the reference signal with a switching threshold, before the interval for transmitting the detection signal reaches 200 ms; when any one of the receiving power and the SINR of the reference signal is smaller than the switching threshold, switching, to the first frequency band, the current data transmission frequency band from the second frequency band, or the cooperative transmission of the first frequency band with the second frequency band; otherwise maintaining the current data transmission frequency band unchanged.

In some embodiments, the channel LOS/NLOS information about the second frequency band is calculated by: a) calculating a peakness $K_h$ of channel impulse response of the second frequency band:

$$K_h = \frac{E[(|h(t)| - \mu_{|h|})]^4}{E[(|h(t)|^2 - \mu_{|h|})^2]^2} = \frac{E[(|h(t)| - \mu_{|h|})]^4}{\sigma_{|h|}^4},$$

where, h(t) is a channel power gain, $\mu_{|h|}$ is a first moment of the channel power gain h(t), and $\sigma_{|h|}$ is a second moment of the channel power gain h(t); b) calculating a slope $S_k$ of channel impulse response of the second frequency band:

$$S_k = \frac{\frac{1}{N}\sum_{t=1}^{N}(|h(t)| - \mu_{|h|})^3}{\sigma_{|h|}^3} = \frac{E[|h(t)|^3]}{\sigma_{|h|}^3},$$

where, N is a number of multipath; c) calculating a Rice coefficient K of channel impulse response of the second frequency band:

$$K = \frac{|h_1(t)|^2}{\sum_{2}^{N}|h_n(t)|^2},$$

wherein, $h_1(t)$ is the channel power gain for the first path, $h_n(t)$ is the channel power gain for other multipath; d) calculating a Kolmogorov-Smirnov (K-S) test value Z:

$$Z = \sqrt{N}\max_i(|F_N(h_{i-1}) - F(h_i)|, |F_N(h_i) - F(h_i)|),$$

wherein, $h_i$ is the power gain of ith channel, $F(h_i)$ represents an accumulated experience distribution function for a sample set $h_i$; e) calculating a fuzzy membership matrix $\Re$ for all channels' characteristic parameters:

$$\Re = \begin{bmatrix} R_1 \\ R_2 \\ R_3 \\ R_4 \end{bmatrix} = \begin{bmatrix} r_{L,1} & r_{N,1} \\ r_{L,2} & r_{N,2} \\ r_{L,3} & r_{N,3} \\ r_{L,4} & r_{N,4} \end{bmatrix}$$

wherein, $r_{L,1}$ is the fuzzy membership coefficient of the first channel characteristic parameter, peakness $K_h$, to the LOS channel, $r_{L,2}$ is the fuzzy membership coefficient of the second channel characteristic parameter, slope $S_k$, to the LOS channel, $r_{L,3}$ is the fuzzy membership coefficient of the third channel characteristic parameter, Rice coefficient K, to the LOS channel, $r_{L,4}$ is the fuzzy membership coefficient of the fourth channel characteristic parameter, Kolmogorov-Smirnov (K-S) test value Z to the LOS channel, $r_{N,1}$ is the fuzzy membership coefficient of the first channel characteristic parameter, peakness $K_h$, to the NLOS channel, $r_{N,2}$ is the fuzzy membership coefficient of the second channel characteristic parameter, slope $S_k$, to the NLOS channel, $r_{N,3}$ is the fuzzy membership coefficient of the third channel characteristic parameter, Rice coefficient K, to the NLOS channel, $r_{N,4}$ is the fuzzy membership coefficient of the fourth channel characteristic parameter Kolmogorov-Smirnov K-S test value Z to the NLOS channel; f) calculating a weighted coefficient set of the channel characteristic parameters W:

$$W=[w_1,w_2,w_3,w_4],$$

where, $w_1$ is the weighted coefficient for the first channel characteristic parameter, peakness $K_h$, $w_2$ is the weighted coefficient for the second channel characteristic parameters, slope $S_k$, $w_3$ is the weighted coefficient for the third channel characteristic parameter, Rice coefficient K, and $w_4$ is the weighted coefficients for the fourth channel characteristic parameter, Kolmogorov-Smirnov (K-S) test value Z; g) calculating the fuzzy comprehensive evaluation matrix A: A=W×$\Re$=[$a_L,a_N$], where, $a_L$ is a fuzzy membership degree of LOS channel, $a_N$ is a fuzzy membership degree of NLOS channel.

In some embodiments, when the current data transmission frequency band is the second frequency band, the receiving power RP" and the signal interference and noise ratio SINR" is calculated by the following formulas:

RP"=PRS"*PathLoss",

SINR"=S"/(I"+N")

where, PRS" is a linear average of powers transmitted by resource elements RE contained in a system reception bandwidth of the second frequency band while operating in the transmission mode of the second frequency band; PathLoss" is the path loss between the base station and the user equipment while operating in the transmission mode of the second frequency band; S" is a reference signal power while operating in the transmission mode of the second frequency band; I" is an interfering signal power while operating in the transmission mode of the second frequency band; and N" is a noise power while operating in the transmission mode of the second frequency band.

In some embodiments, when the current data transmission band is the cooperative transmission of the first frequency band with the second frequency band, the receiving power RP''' and SINR''' of the reference signals are calculated with the following formulas:

$$RP''' = PRS''' * PathLoss''',$$

$$SINR''' = S'''/(I'''+N'''),$$

where, PRS''' is a linear average of powers transmitted by all resource elements RE contained in the detection signal in the system reception bandwidth of the second frequency band while the system is operating in the cooperative transmission mode of the first frequency band with the second frequency band; PathLoss''' is a path loss between the base station and the user equipment while the system is operating in the cooperative transmission mode of the first frequency band with the second frequency band; S''' is a reference signal power of the second frequency band while the system is operating in the cooperative transmission mode of the first frequency band with the second frequency band; I''' is an interfering signal power of the second frequency band while the system is operating in the cooperative transmission mode of the first frequency band with the second frequency band; and N''' is a noise power of the second frequency band while the system is operating in the cooperative transmission mode of the first frequency band with the second frequency band.

In some embodiments, the method further comprises: transmitting, by the base station, the detection signal on the second frequency band again, when the transmission interval of the detection signal reaches 200 ms; calculating, by the user equipment, the LOS/NLOS information about the second frequency band, receiving power of the detection signal RP'''' and SINR'''' of the detection signal, by using the currently received detection signals, and feeding back the detection information via the first frequency band; wherein, the receiving power RP'''' and SINR'''' of the detection signal are calculated with the following formulas:

$$RP'''' = PRS'''' * PathLoss'''',$$

$$SINR'''' = S''''/(I''''+N''''),$$

where, PRS'''' is a linear average of powers transmitted by all resource elements RE contained in the detection signals within the system reception bandwidth of the second frequency band when the interval for transmitting the detection signal reaches 200 ms and the detection signal is retransmitted; PathLoss'''' is a path loss between the base station and the user equipment when the interval for transmitting the detection signal reaches 200 ms and the detection signal is retransmitted; S'''' is a detection signal power when the interval for transmitting the detection signal reaches 200 ms and the detection signal is retransmitted; I'''' is an interfering signal power when the interval for transmitting the detection signal reaches 200 ms and the detection signal is retransmitted; and N'''' is a noise power when the interval for transmitting the detection signal reaches 200 ms and the detection signal is retransmitted.

In another aspect, a base station is provided. The base station comprises: a first transmitter configured to transmit data on a first frequency band; a second transmitter configured to transmit, on a second frequency band, a detection signal for detecting channel conditions of the second frequency band to a user equipment; a receiver configured to receive channel condition information about the second frequency band from the user equipment on the first frequency band; wherein, the channel condition information about the second frequency band is generated by the user equipment based on the received detection signals; and a processor configured to select a current data transmission frequency band based at least in part on the received channel condition information about the second frequency band and/or traffic requirement information; wherein the current data transmission frequency band is any one of the first frequency band, the second frequency band, or cooperative transmission of the first frequency band with the second frequency band.

In some embodiments, the second transmitter is configured to transmit the detection signals to the user equipment at a time interval of 200 ms. The base station may comprise a C-band frontend module and a millimeter wave module; the first transmitter may be included in the C-band frontend module; and the second transmitter may be included in the millimeter wave module.

In some embodiments, the receiver is further configured to receive a receiving power and SINR of a reference signal from the user equipment; wherein the receiving power and SINR of the reference signal is calculated by using the data received on the second frequency band, by the user equipment; the processor is further configured to compare the receiving power and SINR of the reference signal with a switching threshold, when any one of the receiving power and SINR of the reference signal is smaller than the switching threshold, to switch the current data transmission frequency band, from the second frequency band or from the cooperative transmission of the first frequency band with the second frequency band to the first frequency band, otherwise, to maintain the current data transmission band.

In a yet another aspect, a user equipment is provided. The user equipment comprises: a first receiver configured to receive data on a first frequency band; a second receiver configured to receive, from a base station and on the second frequency band, a detection signal for detecting a channel condition of the second frequency band; a processor configured to generate channel condition information about the second frequency band based on the received detection signal, wherein, the channel condition information about the second frequency band comprises channel LOS/NLOS information about the second frequency band, receiving power of the detection signal and SINR of the detection signal; and a transmitter configured to transmit the channel condition information about the second frequency band to the base station via the first frequency band.

The user equipment may comprise a C-band Radio Frequency (RF) module and a millimeter wave module; the first receiver may be included in the C-band Radio Frequency (RF) module; and the second receiver may be included in the millimeter wave module.

In a yet another aspect, a system for wireless communication is provided. The system comprises a base station and a user equipment. The base station and the user equipment may be configured to perform any one of the wireless communication methods as stated in the above embodiments.

BRIEF DESCRIPTION OF DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The embodiments of the present invention will be further described in detail below with reference to the drawings.

Figure 1:
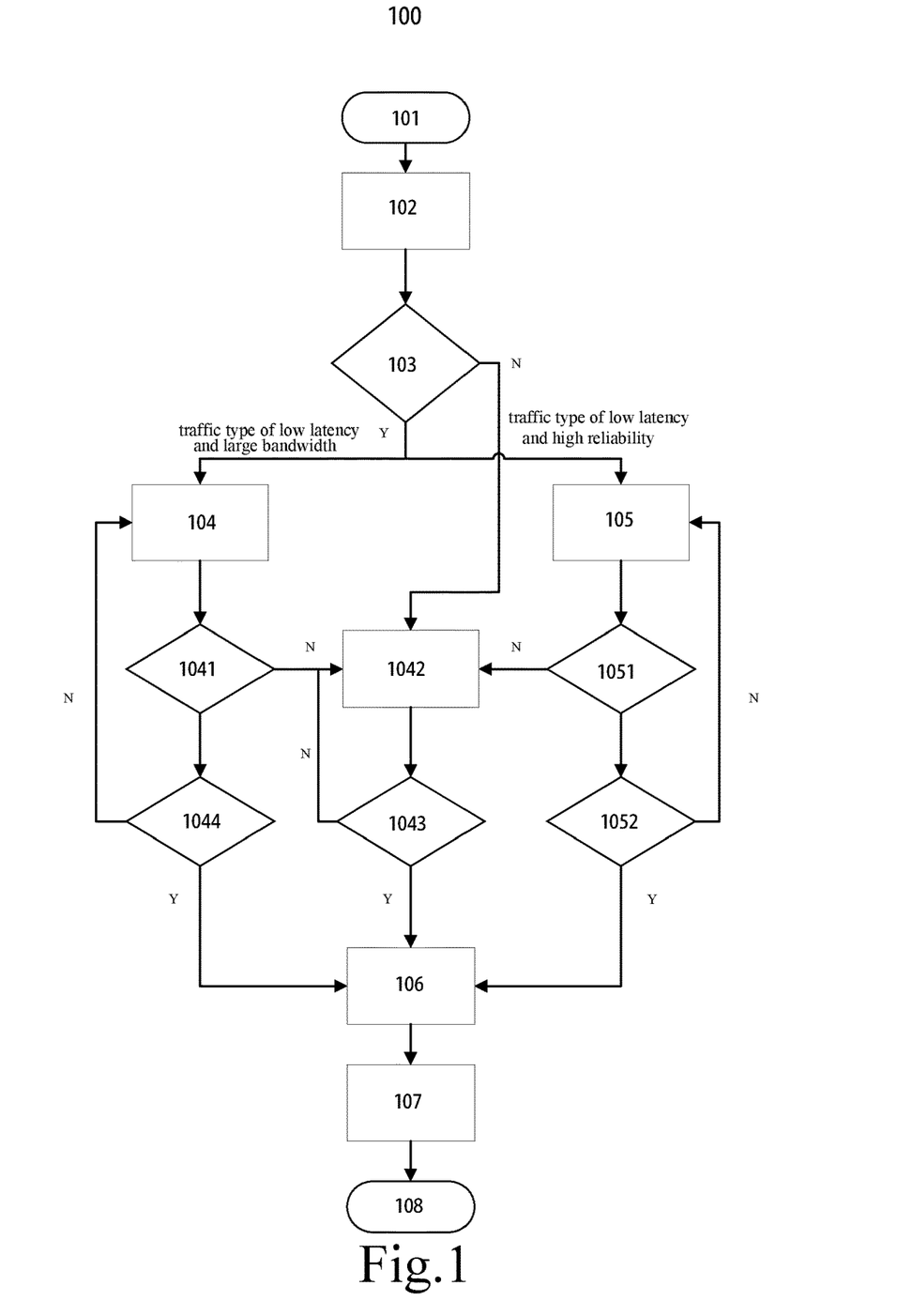
FIG. 1 is a flowchart of a wireless communication method in accordance with embodiments of the present invention.
Figure 2:
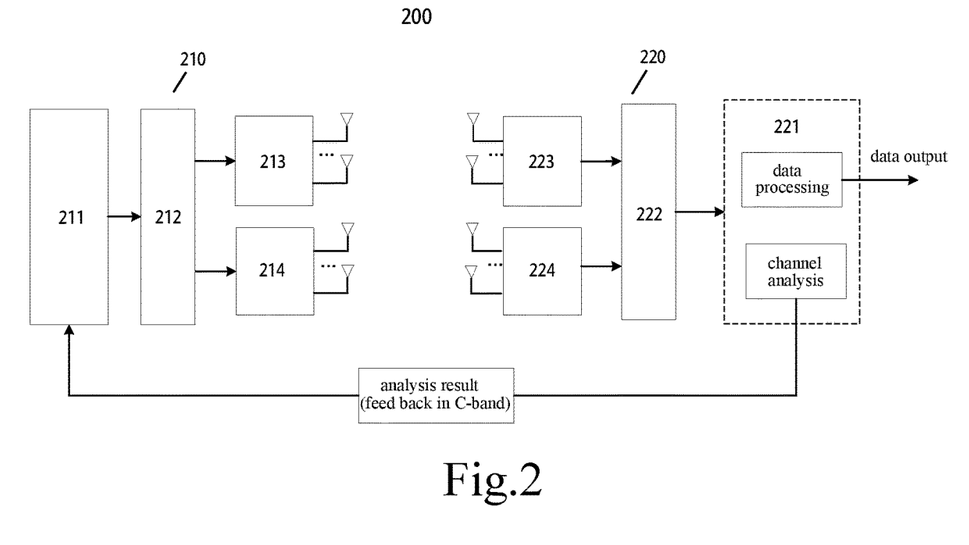
FIG. 2 is a block diagram of a wireless communication system in accordance with embodiments of the present invention.

FIG. 1 shows a flowchart of a wireless communication method 100 in accordance with embodiments of the present invention. FIG. 2 shows a block diagram of a wireless communication system 200 in accordance with embodiments of the present invention. The system 200 may be configured to perform the method 100.

As shown in FIG. 2, the system 200 comprises a base station (BS) 210 and a user equipment (UE) 220, BS 210 comprises at least a high and low frequency cooperative baseband module 211, an intermediate frequency module 212, a C-band Radio Frequency (RF) module 213 and a millimeter wave module 214. UE 220 comprises at least a high and low frequency cooperative baseband module 221, an intermediate frequency module 222, a C-band Radio Frequency (RF) module 223 and a millimeter wave module 224. In some embodiments, the system 200 is a point-to-point wireless communication dual-frequency integrated system.

The high and low frequency cooperative baseband modules 211 and 221 may be applicable to C-band and millimeter wave band; and each of them may include an analogue-to-digital (AD)/digital-to-analogue (DA) conversion module, an encoding/decoding module, a modulation/demodulation module, a digital precoding module, a channel estimation module and a channel feature analysis module. The AD/DA conversion module may include N AD/DA converters for converting digital/analog signals into analog/digital signals. The encoding module may include a source encoder and a channel encoder. The source encoder compresses signals; and the channel encoder operates to resist channel interference and attenuation by using Turbo coding and adding redundant information. The encoding module further encrypts signals at the same time. The decoding module may decode and decrypt the received signals to obtain information. The modulation module may utilize 64QAM modulation to increase the amount of information to be carried within a single symbol. The digital precoding module is configured to calculate a forming matrix to generate a digital precoding codebook for the base station. The channel estimation module is configured to calculate a receiving power and SINR. The channel feature analysis module is configured to calculate channel LOS/NLOS information.

The intermediate frequency modules 212 and 222 are configured to perform up-conversion or down-conversion of signals. The high and low frequency cooperative baseband module 221 may perform data processing and channel analysis based on converted signals to output data, and feed the analysis results back to the high and low frequency cooperative baseband module 211 of the base station 210 via C-band.

The C-band Radio Frequency (RF) module 223 includes a C-band antenna array to be communicatively connected with the base station 210; and the size of the antenna is larger than that of the millimeter wave module 224. The C-band Radio Frequency (RF) module 213 has similar structure.

Each of the millimeter wave modules 214 and 224 includes a high frequency modulation/demodulation module, a power amplifier, a filter, a low noise amplifier and a millimeter wave large scale antenna array, and determines, by beam management, best beam for data transmission and reception. The power amplifier amplifies signals to cause them to obtain enough RF power. The filter filters the signals to remove interfering clutters. The low noise amplifier amplifies the received signals for post processing. The beam management includes processes of beam scanning, beam estimation, beam decision, beam report, beam indication and beam failure recovery.

The system 200 can operate in C-band or millimeter wave band separately, and can also operate in cooperative mode of C-band with millimeter wave, thus can be utilized in many communication scenarios and provide un-interrupted data transmission.

Referring to FIG. 1, the wireless communication method 100 comprises the following steps:

Step 101: the base station performs initial access; The base station transmits data by using C-band while performing initial access.

Figure 3:
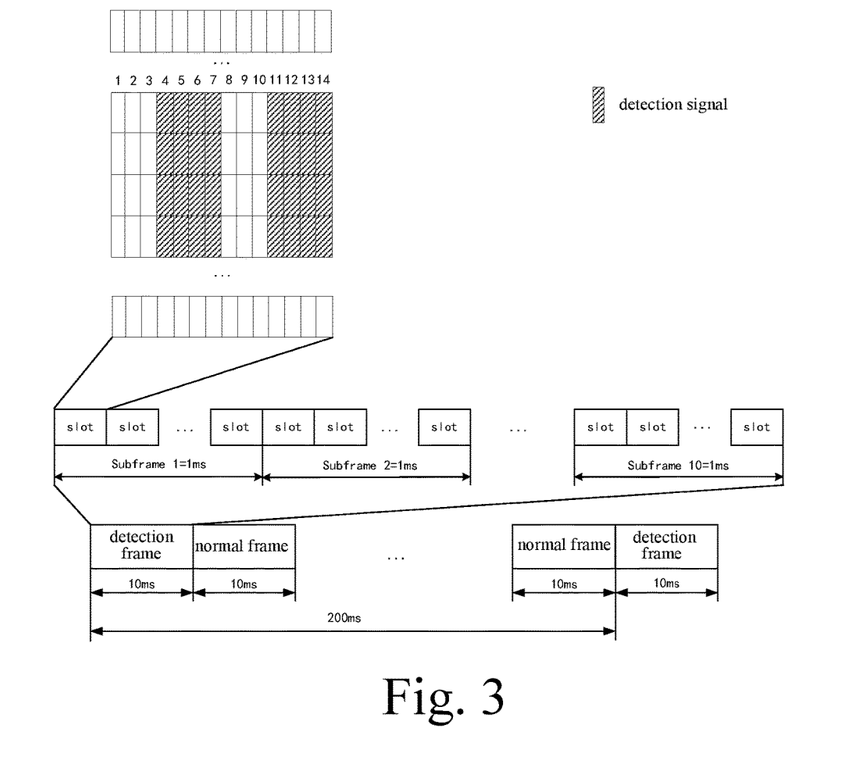
FIG. 3 is a frame structure diagram of the detection signal in some embodiments of the present invention.

Step 102: initial channel detection for millimeter wave band, comprising:

Sub-step 2.1) providing a detection signal to be designed to have a frame format that each detection signal is provided at intervals of 200 ms and contains 1 detection frame and 19 normal frames; each detection frame is of 10 ms and contains 10 sub-frames; each sub-frame is of 1 ms and contains 4 slots; each slot contains 14 OFDM symbols; each detection signal occupies 8 OFDM symbols in each slot in time domain, and all of the detection signals are inserted within the whole band in frequency domain. FIG. 3 shows a frame structure diagram of the detection signal in some embodiments.

Sub-step 2.2) transmitting, by BS, the detection signal in the millimeter wave band; using the received detection signal, by UE, to calculate the channel condition information, comprising the channel line of sight/non-line of sight (LOS/NLOS) information, receiving power RP' of the detection signal, and signal interference noise ratio SINR' of the detection signal, and feeding the channel condition information back to BS via C-band.

In prior art, methods for calculating LOS/NLOS information include: a method based on likelihood ratio detection, an analysis method based on machine learning theory, a channel identification method based on blur association analysis and a method of extracting signal features with channel state information. Some embodiments of the present invention may utilize but not limited to the channel identification method based on blur association analysis, to perform grey correlation analysis on channel feature parameters, such as peakness $K_h$, slope $S_k$, Rice coefficient K and Kolmogorov-Smirnov (K-S) test value Z, to normalize the correlated coefficients as the weighting coefficients for fuzzy comprehensive evaluation method, and to obtain the channel condition information by comparing fuzzy membership of LOS and NLOS channels.

Sub-step 2.2.1) calculating the peakness $K_h$ of channel impulse response in the millimeter wave band channel;

The peakness is an eigen value for measuring the magnitude of data fluctuations and may also be used to characterize LOS strength of a channel. In LOS channel, the channel impulse response has LOS path component and its power is much greater than those of other paths, therefore, the LOS channel impulse response has a big peakness. In contrast, in NLOS channel, since there is no LOS path component or LOS path component has a power less than those of other paths, the channel impulse response has relatively smooth amplitude and a small peakness. Therefore, it is possible to identify channel conditions according to the peakness $K_h$. The peakness is calculated by using the following formula:

$$K_h = \frac{E\left[(|h(t)|-\mu_{|h|})^4\right]}{E\left[(|h(t)|^2-\mu_{|h|})^2\right]^2} = \frac{E\left[(|h(t)|-\mu_{|h|})^4\right]}{\sigma_{|h|}^4},$$

where, h(t) is the channel power gain, $\mu_{|h|}$ is the first moment of the channel power gain h(t), and $\sigma_{|h|}$ is the second moment of the channel power gain h(t);

Sub-step 2.2.2) calculating the slope $S_k$ of channel impulse response in the millimeter wave band.

The slope is a statistical amount for describing distribution pattern of sample data and characterizing the symmetry of overall value distribution of samples. In the LOS channel, the amplitude of channel impulse response deviates from normal distribution due to the presence of LOS path component, the slope is relatively large. In case of NLOS, the amplitude of channel impulse response is distributed randomly, closer to normal distribution, and the slope is closer to 0. The slope $S_k$ is calculated by using the following formula:

$$S_k = \frac{\frac{1}{N}\sum_{t=1}^{N}(|h(t)|-\mu_{|h|})^3}{\sigma_{|h|}^3} = \frac{E\left[|h(t)|^3\right]}{\sigma_{|h|}^3},$$

where, N is the number of multipath.

Sub-step 2.2.3) calculating Rice coefficient K of channel impulse response in the millimeter wave band:

Rice coefficient K is defined as the ratio of the LOS propagation power to the power of scattering paths. When there is a direct path between the sending and receiving ends, namely in the LOS environment, the signal envelop follows Rice distribution; otherwise, in the NLOS environment, the signal envelop follows Rayleigh Distribution.

Channel Rice coefficient K is the ratio of the modulus of the first path channel gain to the sum of modulus of other multipath channel gains. Generally, the Rice coefficient in LOS channel is greater than the Rice coefficient in the NLOS channel.

The Rice coefficient K is calculated by using the following formula:

$$K = \frac{|h_1(t)|^2}{\sum_{2}^{N}|h_n(t)|^2},$$

where, $h_1(t)$ is the first path channel power gain, $h_n(t)$ is other multipath channel gain.

Sub-step 2.2.4) calculating Kolmogorov-Smirnov (K-S) test value Z:

With a K-S test method, it is possible to determine whether data follows the same distribution according to the significance difference fitted by data statistics. In channel identification methods, a non-parameter K-S test method may be used for identifying channels according to the difference level between the amplitude of channel impulse response and normal distribution. Since NLOS channel lacks large power LOS paths, the amplitude of channel impulse response is closer to normal distribution. Therefore, if the test value Z of K-S test method is smaller than the test value of normal distribution, the channel is a NLOS channel, otherwise, the channel is a LOS channel.

The Kolmogorov-Smirnov (K-S) test value Z is calculated by using the following formula:

$$Z = \sqrt{N}\max_i(|F_N(h_{i-1})-F(h_i)|, |F_N(h_i)-F(h_i)|),$$

where, $h_i$ is the ith channel power gain, $F(h_i)$ represents the accumulated experience distribution function of the sample set $h_i$;

Sub-step 2.2.5) calculating the fuzzy membership matrix $\Re$ of all channel characteristic parameters:

The prior channel characteristic parameters for LOS and NLOS channels are not a fixed value, but in a distribution range, and they cannot be used directly for calculating the distance between them and the actual channel characteristic parameter. Therefore, it is necessary to utilize the fuzzy theory to characterize the size relationship of the distance between channel characteristic parameters and channel states. The bigger the fuzzy membership coefficient is, the smaller the distance between the channel characteristic parameters and the channel states. Since the channel only includes two environments, namely LOS channel and NLOS channel, the fuzzy membership coefficient $r_{L,j}$, $r_{N,j}$ is normalized; therefore the fuzzy membership coefficient $r_{L,j}$ of the channel characteristic parameters in the case of LOS channel may be defined as:

$$r_{L,j}=1-r_{N,j} \; j=1,2,3,4$$

where, $(r_{L,j}, r_{N,j})$ is a row of the fuzzy membership matrix $\Re$ between the channel characteristic parameter set and the channel state set.

The fuzzy membership matrix $\Re$ of all channel characteristic parameters is obtained according to the fuzzy membership coefficients by using the following formula:

$$\Re = \begin{bmatrix} R_1 \\ R_2 \\ R_3 \\ R_4 \end{bmatrix} = \begin{bmatrix} r_{L,1} & r_{N,1} \\ r_{L,2} & r_{N,2} \\ r_{L,3} & r_{N,3} \\ r_{L,4} & r_{N,4} \end{bmatrix},$$

where, $r_{L,1}$ is the fuzzy membership coefficient of the first channel characteristic parameter, peakness $K_h$, to the LOS channel; $r_{L,2}$ is the fuzzy membership coefficient of the second channel characteristic parameter, slope $S_k$, to the LOS channel; $r_{L,3}$ is the fuzzy membership coefficient of the third channel characteristic parameter, Rice coefficient K, to the LOS channel; $r_{L,4}$ is the fuzzy membership coefficient of the fourth channel characteristic parameter, Kolmogorov-Smirnov (K-S) test value Z, to the LOS channel; $r_{N,1}$ is the fuzzy membership coefficient of the first channel characteristic parameter, peakness $K_h$, to the NLOS channel; $r_{N,2}$ is the fuzzy membership coefficient of the second channel characteristic parameter, slope $S_k$, to the NLOS channel; $r_{N,3}$ is the fuzzy membership coefficient of the third channel characteristic parameter, Rice coefficient K, to the NLOS channel; $r_{N,4}$ is the fuzzy membership coefficient of the fourth channel characteristic parameter, Kolmogorov-Smirnov (K-S) test value Z, to the NLOS channel;

Sub-step 2.2.6) calculating a set of weighted coefficient W of the channel characteristic parameters:

$$W = [w_1, w_2, w_3, w_4], 0 \le w_j \le 1 \text{ and } \sum_{j=1}^{4} w_j = 1,$$

where, $w_1$ is the weighted coefficient for the first channel characteristic parameter, peakness $K_h$; $w_2$ is the weighted coefficient for the second channel characteristic parameter, slope $S_k$; $w_3$ is the weighted coefficient for the third channel characteristic parameter, Rice coefficient K; and $w_4$ is the weighted coefficient for the fourth channel characteristic parameter, Kolmogorov-Smirnov (K-S) test value Z;

Sub-step 2.2.7) calculating the fuzzy comprehensive evaluation matrix A: according to the channel fuzzy membership matrix $\Re$ and the dimension mapping weighting coefficients W, performing synthesis operation of them by using a fuzzy comprehensive evaluation method, to obtain the fuzzy comprehensive evaluation matrix A:

$$A = W \times \Re = [a_L, a_N],$$

where, $a_L$ is a fuzzy membership degree of LOS channel, $a_N$ is a fuzzy membership degree of NLOS channel;

Sub-step 2.2.8) determining channel conditions by comparing magnitudes of the two fuzzy membership degrees $a_L$ and $a_N$: if $a_L$ is greater than $a_N$, the channel belongs to LOS channel; if $a_L$ is less than $a_N$, the channel belongs to NLOS channel;

Sub-step 2.2.9) calculating the receiving power RP' and the signal interference noise ratio SINR' of the detection signal;

$$RP' = PRS' * PathLoss',$$

$$SINR' = S'/(I' + N'),$$

where, PRS' is a linear average of powers transmitted by all resource elements RE within a system reception bandwidth of the millimeter wave band which are contained in the detection signals when the detection signal is firstly transmitted; PathLoss' is the path loss between BS and UE when the detection signal is firstly transmitted; S' is the power of the detection signal when the detection signal is firstly transmitted; I' is the interfering signal power when the detection signal is firstly transmitted; and N' is the noise power when the detection signal is firstly transmitted.

Step 103: BS selects the current data transmission band according to the feedback information via C-band and the user's traffic requirements.

Sub-step 3.1) assuming that thresholds for switching frequency band comprise: RP=−105 dBm SINR=−3 dB';

Sub-step 3.2) BS compares the received feedback information with the thresholds;

if the current millimeter wave channel is in NLOS state, or one of RP' and SINR' is smaller than the switching threshold ("N" as shown), then the C-band is still used for data transmission (i.e., a first data transmission mode using C-band is maintained at step 1042), proceeding to step 106; if the current millimeter wave channel is in LOS state, and both RP' and SINR' are greater than the switching thresholds ("Y" as shown), the data transmission modes may contain a second data transmission mode using millimeter wave band, and a third data transmission mode by cooperative use of C-band with millimeter wave band (i.e., simultaneously transmitting data by using C-band and millimeter wave band), proceeding to step 3.3);

Sub-step 3.3) selecting data transmission mode according to user's traffic types: if the user's traffic is a type of requiring high reliability and low latency, such as enhanced mobility broadband (eMBB) in open environment, selecting the third data transmission mode by cooperative use of C-band with millimeter wave band, and proceeding to step 105; otherwise, for example, if the user's traffic is a type of requiring large bandwidth and low latency, selecting the second data transmission mode using millimeter wave band, and proceeding to step 104.

Step 104: tracking data transmission condition under the millimeter wave mode; calculating, by UE, the receiving power RP" of the reference signal and the signal to interference plus noise ratio SINR" of the reference signal by using the data received in the millimeter wave band, and feeding them back to BS, to track the data transmission condition in the millimeter wave band:

Sub-step 4.1) calculating the receiving power RP" and SINR" of the reference signal by using the below formula:

$$RP'' = PRS'' * PathLoss'',$$

$$SINR'' = S''/(I'' + N''),$$

where, PRS" is the linear average of powers transmitted by all resource elements RE within a system reception bandwidth of the millimeter wave band which are contained in the detection signals while operating in the second data transmission mode using millimeter wave band; PathLoss" is the path loss between BS and UE while operating in the second data transmission mode; S" is the reference signal power while operating in the second data transmission mode, I" is the interfering signal power while operating in the second data transmission mode, and N" is the noise power while operating in the second data transmission mode.

Sub-step 4.2) comparing, by BS, the feedback RP" and SINR" with the switching thresholds (step 1041), before determining that the transmission interval for the detection signal reaches 200 ms (step 1044):

If RP" is smaller than the threshold RP, or SINR" is smaller than the threshold SINR ("N" as shown at step 1041), then the data transmission band is switched from the millimeter wave band to the C-band (at step 1042), and proceeding to step 106 when determining that the transmission interval for the detection signal reaches 200 ms ("Y" as shown in step 1043);

Otherwise ("Y" as shown at step 1041), the millimeter wave band is maintained for data transmission (step 104), and proceeding to step 106 when determining that the transmission interval for the detection signal reaches 200 ms ("Y" as shown in step 1044).

Step 105: tracking data transmission condition under the third data transmission mode, comprising:

calculating, by UE, the receiving power RP''' of the reference signal and the SINR''' of the reference signal by using the data received in the millimeter wave band, and feeding them back to BS, in order to track the data transmission condition in the millimeter wave band:

Sub-step 5.1) calculating the receiving power RP''' and SINR''' of the reference signal by using the following formulas:

$$RP''' = PRS''' * PathLoss''',$$

$$SINR''' = S'''/(I''' + N'''),$$

where, PRS''' is the linear average of powers transmitted by all resource elements RE within a system reception bandwidth of the millimeter wave band which are contained in the detection signals while the system is operating in the third data transmission mode; PathLoss''' is the path loss between BS and UE while the system is operating in the third data transmission mode; S''' is the reference signal power in millimeter wave band while the system is operating in the third data transmission mode; I''' is interfering signal power in the millimeter wave band while the system is operating in the third data transmission mode; and N''' is noise power in the millimeter wave band while the system is operating in the third data transmission mode.

Sub-step 5.2) comparing, BS, the feedback RP''' and SINR''' with the switching thresholds (step 1051), before determining that the transmission interval for the detection signal reaches 200 ms (step 1052):

If RP''' is smaller than the threshold RP, or SINR''' is smaller than the threshold SINR ("N" as shown in step 1051), then the data transmission mode is switched from the third data transmission mode (C-band and millimeter wave band) to the first data transmission mode (C-band), and proceeding to step 106 when determining that the transmission interval for the detection signal reaches 200 ms ("Y" as shown in step 1052);

Otherwise ("N" as shown in step 1052), the third data transmission mode (C-band and millimeter wave band) is maintained (step 105), and then proceeding to step 106 until determining that the transmission interval for the detection signal reaches 200 ms ("Y" as shown in step 1052).

Step 106: transmitting, by BS, the detection signal again, to initiate channel detection again.

Sub-step 6.1) transmitting, by BS, the detection signal again in the millimeter wave band when the interval of transmitting detection signal reaches 200 ms; and calculating, by UE, LOS information or NLOS information of the millimeter wave band channel by using the currently received detection signal, the calculation process is similar to those of sub-steps 2.2.1)-2.2.8) in step 102.

Sub-step 6.2) calculating the receiving power RP'''' and signal to interference plus noise ratio SINR'''' of the detection signal;

$$RP'''' = PRS'''' * PathLoss'''',$$

$$SINR'''' = S''''/(I'''' + N''''),$$

where, PRS'''' is the linear average of powers transmitted by all resource elements RE within a system reception bandwidth of the millimeter wave band which are contained in the detection signals when the interval for transmitting detection signal reaches 200 ms; PathLoss'''' is the path loss between BS and US when the interval for transmitting detection signal reaches 200 ms and the detection signal is transmitted again; S'''' is the detection signal power when the interval for transmitting detection signal reaches 200 ms and the detection signal is transmitted again; I'''' is the interfering signal power when the interval for transmitting detection signal reaches 200 ms and the detection signal is transmitted again; and N'''' is the noise power when the interval for transmitting detection signal reaches 200 ms and the detection signal is transmitted again.

Sub-step 6.3) feeding, via C-band and back to BS, the calculated LOS information or NLOS information, receiving power RP'''' of the detection signal, and SINR'''' of the detection signal.

Step 107: switching data transmission mode.

Figure 4A:
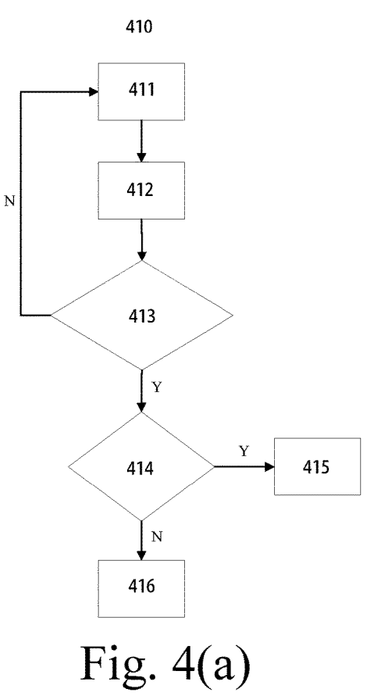
FIG. 4(a), FIG. 4(b) and FIG. 4(c) show sub-flowcharts for switching operating modes in some embodiments of the present invention.
Figure 4B:
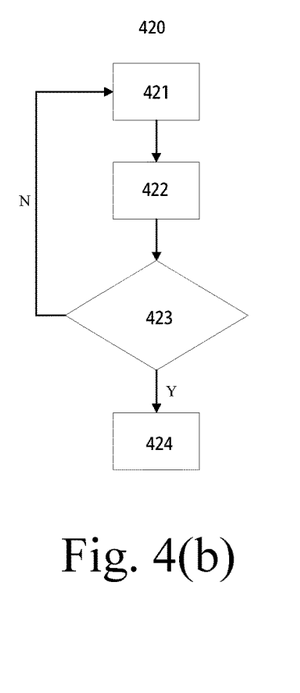
Figure 4C:
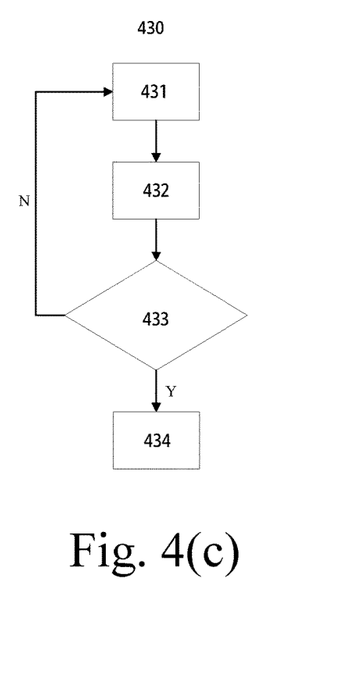

Referring to FIGS. 4(*a*), 4(*b*) and 4(*c*), the base station performs comprehensive analysis on the feedback information from the current data transmission frequency band and C-band, and switches the data transmission band:

As shown in the sub-flow 410 of FIG. 4(*a*), the C-band is currently used for data transmission (step 411); the channel detection is performed (step 412); if it is determined that the millimeter wave channel is LOS, and both RP'''' and SINR'''' are greater than the switching thresholds ("Y" as shown in step 413), then proceeding back to sub-step 3.3); otherwise ("N" as shown in step 413), the C-band is maintained for data transmission (step 411); further, if the user's traffic is a type of requiring high reliability and low latency, selecting the third data transmission mode by cooperative use of C-band with millimeter wave band (step 416); otherwise, for example, if the user's traffic is a type of requiring large bandwidth and low latency, selecting the second data transmission mode using millimeter wave band (step 415). Then the process returns to step 106.

As shown in the sub-flow 420 of FIG. 4(*b*), the millimeter wave band is currently used for data transmission (step 421); the channel detection is performed (step 422); if it is determined that the channel characteristic of the millimeter wave band is NLOS, and one of RP'''' and SINR'''' is smaller than the switching threshold ("Y" as shown in step 423), then the current data transmission band is switched to C-band (step 424); and then the process returns to step 106; otherwise ("N" as shown in step 423), the millimeter wave band is maintained for data transmission (step 421). Then the process returns to step 104.

As shown in the sub-flow 430 of FIG. 4(*c*), the cooperative mode of C-band with millimeter wave band is currently used for data transmission (step 431); the channel detection is performed (step 432); if it is determined that the channel characteristic of the millimeter wave band is NLOS, and one of RP'''' and SINR'''' is smaller than the switching threshold ("Y" as shown in step 433), then the current data transmission band is switched to C-band (step 434); and the process returns to step 106; otherwise ("N" as shown in step 433), the cooperative mode of C-band with millimeter wave band is maintained for data transmission. Then the process returns to step 105.

Step 108: the data transmission ends; and the comprehensive analysis is performed on the feedback information.

As compared to prior art, the above embodiments of the present invention have at least one of the following advantages.

The embodiments can transmit detection signals having a novel frame format, to track in real time and detect periodically channels of the millimeter wave band in multi-dimensions of space, time and frequency, so as to provide a basis for adaptive switching among C-band and/or millimeter wave band (e.g., the first, second and third data transmission modes) in the dual-frequency integrated system.

The embodiments can track in real time and detecting periodically the millimeter wave channels, to realize adaptive mode selection among the first, second and third data transmission modes using C-band and/or millimeter wave band in dual-frequency integrated system. The embodiments remedy inflexibility of switching communication sub-modules in prior art, and can improve reliability and flexibility of the dual-frequency switching.

The embodiments can adaptively select and switch frequency bands for data transmission paths according to the channel information detected by using the inventive detection signal, so as to avoid communication transmission interruption when channel conditions in the communications system change, and guarantee succeeding of data communications.

While the present invention has been shown and described in connection with the above exemplary embodiments, it will be apparent to those skilled in the art that these embodiments are merely illustrative, not limitative, and modifications and variations can be made without departing from the spirit and scope of the present invention as defined by the appended claims.

We claim:

1. A method for wireless communication, comprising:
transmitting data on a first frequency band;
transmitting, on a second frequency band, a detection signal for detecting a channel condition of the second frequency band, wherein the detection signal has a frame format in which: each detection signal is provided at intervals of 200 ms and contains 1 detection frame and 19 normal frames; each detection frame is of 10 ms and contains 10 sub-frames; each sub-frame is of 1 ms and contains 4 slots; each slot contains 14 OFDM symbols; each detection signal occupies 8 OFDM symbols in each slot in time domain, and all of detection signals are inserted within a whole band in frequency domain;
generating channel condition information about the second frequency band based on a received detection signal;
feeding back the channel condition information via the first frequency band; and
selecting a current data transmission frequency band based at least in part on feedback channel condition information about the second frequency band and/or traffic requirement information,
wherein the current data transmission frequency band is any one of the first frequency band, the second frequency band or a cooperative transmission of the first frequency band with the second frequency band.

2. The method of claim 1, wherein the first frequency band is a C-band, and the second frequency band is a millimeter wave band.

3. The method of claim 1, wherein:
the channel condition information about the second frequency band is obtained based on the received detection signals; and
the channel condition information about the second frequency band comprises channel line of sight (LOS)/no-line of sight (NLOS) information about the second frequency band, a receiving power of the detection signal and a signal interference noise ratio (SINR) of the detection signal.

4. The method of claim 1, wherein:
the method is used for wireless communication of a dual-frequency integrated system comprising a base station and a user equipment;
the base station is configured to transmit the detection signal to a user equipment on the second frequency band; and
the user equipment is configured to obtain the channel condition information about the second frequency band based on the received detection signals and to feedback the channel condition information to the base station via the first frequency band.

5. The method of claim 4, wherein the detection signal is transmitted from the base station to the user equipment at intervals of 200 ms.

6. The method of claim 5, further comprising:
receiving, by the user equipment, data on the second frequency band;
calculating a receiving power and a signal interference noise ratio (SINR of a reference signal by using the data received on the second frequency band, and feeding back the receiving power and the SINR of the reference signal to the base station;
comparing, by the base station, the receiving power and the SINR of the reference signal with a switching threshold, before an interval for transmitting the detection signal reaches 200 ms; and
in the event that the current data transmission frequency band is the second frequency band, taking either of the following actions:
if any one of the receiving power and the SINR of the reference signal is smaller than the switching threshold, switching to the first frequency band, the current data transmission frequency band from the second frequency band, or the cooperative transmission of the first frequency band with the second frequency band; or
if both the receiving power and the SINR of the reference signal are not smaller than the switching threshold, maintaining the current data transmission frequency band unchanged.

7. The method of claim 3, wherein the channel LOS/NLOS information about the second frequency band is calculated by:

8a) calculating a peakness $K_h$ of a channel impulse response of the second frequency band:

$$K_h = \frac{E\left[(|h(t)| - \mu_{|h|})\right]^4}{E\left[(|h(t)|^2 - \mu_{|h|})^2\right]^2} = \frac{E\left[(|h(t)| - \mu_{|h|})\right]^4}{\sigma_{|h|}^4},$$

where, h(t) is a channel power gain, $\mu_{|h|}$ is a first moment of the channel power gain h(t), and $\sigma_{|h|}$ is a second moment of the channel power gain h(t);

8b) calculating a slope $S_k$ of the channel impulse response of the second frequency band:

$$S_k = \frac{\frac{1}{N}\sum_{t=1}^{N}(|h(t)| - \mu_{|h|})^3}{\sigma_{|h|}^3} = \frac{E\left[|h(t)|^3\right]}{\sigma_{|h|}^3},$$

where, N is a number of multipath;

8c) calculating a Rice coefficient K of the channel impulse response of the second frequency band:

$$K = \frac{|h_1(t)|^2}{\sum_{2}^{N}|h_n(t)|^2},$$

where, $h_1(t)$ is a channel power gain for a first path, $h_n(t)$ is a channel power gain for other multipath;

8d) calculating a Kolmogorov-Smirnov (K-S) test value Z:

$$Z = \sqrt{N} \max_i (|F_N(h_{i-1}) - F(h_i)|, |F_N(h_i) - F(h_i)|),$$

where, $h_i$ is a power gain of an ith channel, and $F(h_i)$ represents an accumulated experience distribution function for a sample set $h_i$;

8e) calculating a fuzzy membership matrix $\Re$ for all channels' characteristic parameters:

$$\Re = \begin{bmatrix} \Re_1 \\ \Re_2 \\ \Re_3 \\ \Re_4 \end{bmatrix} = \begin{bmatrix} r_{L,1} & r_{N,1} \\ r_{L,2} & r_{N,2} \\ r_{L,3} & r_{N,3} \\ r_{L,4} & r_{N,4} \end{bmatrix}$$

where, $r_{L,1}$ is a fuzzy membership coefficient of a first channel characteristic parameter, the peakness $K_h$, to the channel LOS, $r_{L,2}$ is the fuzzy membership coefficient of a second channel characteristic parameter, the slope $S_k$, to the channel LOS, $r_{L,3}$ is the fuzzy membership coefficient of a third channel characteristic parameter, the Rice coefficient K, to the channel LOS, $r_{L,4}$ is the fuzzy membership coefficient of a fourth channel characteristic parameter, the Kolmogorov-Smirnov (K-S) test value Z to the channel LOS, $r_{N,1}$ is the fuzzy membership coefficient of the first channel characteristic parameter, the peakness $K_h$, to the channel NLOS, $r_{N,2}$ is the fuzzy membership coefficient of the second channel characteristic parameter, the slope $S_k$, to the channel NLOS, $r_{N,3}$ is the fuzzy membership coefficient of the third channel characteristic parameter, the Rice coefficient K, to the channel NLOS, and $r_{N,4}$ is the fuzzy membership coefficient of the fourth channel characteristic parameter, the Kolmogorov-Smirnov (K-S) test value Z, to the channel NLOS;

8f) calculating a set of weighted coefficients W of the channel characteristic parameters:

$$W = [w_1, w_2, w_3, w_4],$$

where, $w_1$ is the weighted coefficient for the first channel characteristic parameter, the peakness $K_h$, $w_2$ is the weighted coefficient for the second channel characteristic parameters, the slope $S_k$, $w_3$ is the weighted coefficient for the third channel characteristic parameter, the Rice coefficient K, and $w_4$ is the weighted coefficients for the fourth channel characteristic parameter, the Kolmogorov-Smirnov (K-S) test value Z; and 8g) calculating a fuzzy comprehensive evaluation matrix A:

$$A = W \times \Re = [a_L, a_N],$$

where, $a_L$ is a fuzzy membership degree of the channel LOS, and $a_N$ is a fuzzy membership degree of the channel NLOS.

8. The method of claim 6, wherein, when the current data transmission frequency band is the second frequency band, the receiving power RP" and the signal interference noise ratio SINR" are calculated by the following formulas:

$$RP" = PRS" * PathLoss", \text{ and}$$

$$SINR" = S"/(I" + N"),$$

where, PRS" is a linear average of powers transmitted by all resource elements RE contained in a system reception bandwidth of the second frequency band while operating in a transmission mode of the second frequency band;

PathLoss" is a path loss between the base station and the user equipment while operating in the transmission mode of the second frequency band;

S" is a reference signal power while operating in the transmission mode of the second frequency band;

I" is an interfering signal power while operating in the transmission mode of the second frequency band; and N" is a noise power while operating in the transmission mode of the second frequency band.

9. The method of claim 6, wherein when the current data transmission band is the cooperative transmission of the first frequency band with the second frequency band, the receiving power RP'" and SINR'" of the reference signals are calculated with the following formulas:

$$RP'" = PRS'" * PathLoss'", \text{ and}$$

$$SINR'" = S'"/(I'" + N'"),$$

where, PRS'" is a linear average of powers transmitted by all resource elements RE contained in the detection signal in a system reception bandwidth of the second frequency band while the system is operating in a cooperative transmission mode of the first frequency band with the second frequency band;

PathLoss'" is a path loss between the base station and the user equipment while the system is operating in the cooperative transmission mode of the first frequency band with the second frequency band;

S'" is a reference signal power of the second frequency band while the system is operating in the cooperative transmission mode of the first frequency band with the second frequency band;

I'" is an interfering signal power of the second frequency band while the system is operating in the cooperative transmission mode of the first frequency band with the second frequency band; and N'" is a noise power of the second frequency band while the system is operating in the cooperative transmission mode of the first frequency band with the second frequency band.

10. The method of claim 5, further comprising:

transmitting, by the base station, the detection signal on the second frequency band again, when the transmission interval of the detection signal reaches 200 ms;

calculating, by the user equipment, a channel line of sight (LOSS/no-line of sight (NLOS) information about the second frequency band, receiving power of the detection signal RP"" and SINR"" of the detection signal, by using the currently received detection signals, and feeding back the detection information via the first frequency band;

wherein, the receiving power RP"" and SINR"" of the detection signal are calculated with the following formulas:

$$RP"" = PRS"" * PathLoss"", \text{ and}$$

$$SINR"" = S""/(I"" + N""),$$

where, PRS"" is a linear average of powers transmitted by all resource elements RE contained in the detection signals within a system reception bandwidth of the second frequency band when the interval for transmitting the detection signal reaches 200 ms and the detection signal is retransmitted;

PathLoss"" is a path loss between the base station and the user equipment when the interval for transmitting the detection signal reaches 200 ms and the detection signal is retransmitted;

S"" is a detection signal power when the interval for transmitting the detection signal reaches 200 ms and the detection signal is retransmitted;

I"" is an interfering signal power when the interval for transmitting the detection signal reaches 200 ms and the detection signal is retransmitted; and N"" is a noise power when the interval for transmitting the detection signal reaches 200 ms and the detection signal is retransmitted.

11. A base station, comprising:
a first transmitter configured to transmit data on a first frequency band;
a second transmitter configured to transmit, on a second frequency band, a detection signal for detecting channel conditions of the second frequency band to a user equipment wherein the detection signal has a frame format in which: each detection signal is provided at intervals of 200 ms and contains 1 detection frame and 19 normal frames; each detection frame is of 10 ms and contains 10 sub-frames; each sub-frame is of 1 ms and contains 4 slots; each slot contains 14 OFDM symbols; each detection signal occupies 8 OFDM symbols in each slot in time domain, and all of the detection signals are inserted within a whole band in frequency domain;
a receiver configured to receive channel condition information about the second frequency band from the user equipment on the first frequency band wherein, the channel condition information about the second frequency band is generated by the user equipment based on the received detection signals; and
a processor configured to select a current data transmission frequency band based at least in part on the received channel condition information about the second frequency band and/or traffic requirement information wherein the current data transmission frequency band is any one of the first frequency band, the second frequency band, or cooperative transmission of the first frequency band with the second frequency band.

12. The base station of claim 11, wherein the first frequency band is a C-band, and the second frequency band is a millimeter wave band.

13. The base station of claim 11, wherein the channel condition information about the second frequency band comprises channel line of sight (LOS)/no-line of sight (NLOS) information about the second frequency band, a receiving power of the detection signal, and a signal interference noise ratio (SINR) of the detection signal.

14. The base station of claim 11, wherein the second transmitter is configured to transmit the detection signals to the user equipment at a time interval of 200 ms.

15. The base station of claim 14, wherein the receiver is further configured to receive a receiving power and a signal interference noise ratio (SINR) of a reference signal from the user equipment wherein the receiving power and the SINR of the reference signal is calculated by using the data received on the second frequency band, by the user equipment; and
the processor is further configured to:
compare the receiving power and the SINR of the reference signal with a switching threshold, when any one of the receiving power and the SINR of the reference signal is smaller than the switching threshold, and
switch the current data transmission frequency band, from the second frequency band or from the cooperative transmission of the first frequency band with the second frequency band to the first frequency band, otherwise, to maintain the current data transmission band.

16. A user equipment, comprising:
a first receiver configured to receive data on a first frequency band;
a second receiver configured to receive, from a base station and on the second frequency band, a detection signal for detecting a channel condition of the second frequency band, wherein the detection signal has a frame format in which: each detection signal is provided at intervals of 200 ms and contains 1 detection frame and 19 normal frames; each detection frame is of 10 ms and contains 10 sub-frames; each sub-frame is of 1 ms and contains 4 slots; each slot contains 14 OFDM symbols; each detection signal occupies 8 OFDM symbols in each slot in time domain, and all of the detection signals are inserted within a whole band in frequency domain;
a processor configured to generate channel condition information about the second frequency band based on the received detection signal, wherein, the channel condition information about the second frequency band comprises channel line of sight (LOS)/no-line of sight (NLOS) information about the second frequency band, a receiving power of the detection signal and a signal interference noise ratio (SINR) of the detection signal; and
a transmitter configured to transmit the channel condition information about the second frequency band to the base station via the first frequency band.

17. The user equipment of claim 16, wherein the first frequency band is a C-band, and the second frequency band is a millimeter wave band.

* * * * *